(12) United States Patent
Gwidt et al.

(10) Patent No.: US 7,900,601 B2
(45) Date of Patent: Mar. 8, 2011

(54) INJECTION ADVANCEMENT FOR PISTON COOLING IN SPARK IGNITION DIRECT INJECTION ENGINES

(75) Inventors: Jesse M. Gwidt, Brighton, MI (US); Jonathan T. Shibata, Whitmore Lake, MI (US); Michael Simon, Plymouth, MI (US); Karen Margaret-Bell Gwidt, Brighton, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/464,988

(22) Filed: May 13, 2009

(65) Prior Publication Data

US 2010/0292909 A1 Nov. 18, 2010

(51) Int. Cl.
*F02M 7/28* (2006.01)
(52) U.S. Cl. ......................... 123/435; 123/299; 701/105
(58) Field of Classification Search .................. 123/435, 123/299–300, 305; 701/103–105
See application file for complete search history.

(56) References Cited

U.S. PATENT DOCUMENTS

| 6,318,074 | B1 * | 11/2001 | Nishimura et al. | 60/284 |
| 6,539,916 | B2 * | 4/2003 | Ueda et al. | 123/295 |
| 7,054,734 | B2 * | 5/2006 | Todoroki et al. | 701/105 |
| 7,334,562 | B2 * | 2/2008 | Jacobsson et al. | 123/299 |
| 7,475,671 | B1 * | 1/2009 | Fattic et al. | 123/406.47 |
| 2009/0104085 | A1 * | 4/2009 | Ichikawa | 422/112 |
| 2009/0240419 | A1 * | 9/2009 | Hoard et al. | 701/103 |

FOREIGN PATENT DOCUMENTS

| JP | 9-287511 | * 11/1997 |
| JP | 2000-179380 | * 6/2000 |
| JP | 2005-291132 | * 10/2005 |

* cited by examiner

*Primary Examiner* — Hai H Huynh

(57) ABSTRACT

An engine system comprises a temperature determination module, a temperature comparison module, and a fuel injection control module. The temperature determination module determines an engine temperature. The temperature comparison module compares the engine temperature and a temperature threshold. The fuel injection control module adjusts a timing of fuel injection from a first range of an intake stroke to a second range of the intake stroke based on the comparison. The first range and the second range do not overlap.

12 Claims, 4 Drawing Sheets

INJECTION ADVANCEMENT FOR PISTON COOLING IN SPARK IGNITION DIRECT INJECTION ENGINES

FIELD

The present disclosure relates to fuel injection in a vehicle and more particularly to the timing of fuel injection.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons. As air flow into the engine increases or decreases, a fuel control system adjusts an amount of fuel that is injected to provide a desired air/fuel mixture to the cylinders.

Referring now to FIG. 1, a functional block diagram of an engine system 100 is presented. The engine system 100 includes an engine 102 that combusts an air/fuel mixture. Air is drawn into an intake manifold 110 through a throttle valve 112. A control module 114 commands a throttle actuator module 116 to regulate opening of the throttle valve 112 to control the amount of air drawn into the intake manifold 110. The throttle actuator module 116 may monitor the position of the throttle valve 112 using one or more throttle position sensors (TPS) 117.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The control module 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based on a signal from the control module 114, an ignition of the air/fuel mixture occurs. The timing of the ignition may be specified relative to a time when the piston is at a topmost position (referred to as top dead center (TDC)), a point at which compression of the air/fuel mixture is maximized.

The combustion of the air/fuel mixture drives the piston down (i.e. initiates a combustion stroke), thereby driving a rotating crankshaft (not shown). The piston expels byproducts of combustion through an exhaust valve 130 during a following exhaust stroke. The byproducts of combustion are exhausted from the vehicle via an exhaust system 134.

Engine coolant is used to cool the engine. A temperature of the engine coolant may be measured using an engine coolant temperature (ECT) sensor 182. The ECT sensor 182 may be located within the engine 102 or at other locations where the coolant is circulated, such as a radiator (not shown).

After the piston reaches TDC (i.e. after the exhaust stroke), the air/fuel mixture is injected into the cylinder 118 during an intake stroke. After a bottom dead center (BDC) position, the air/fuel mixture is compressed during a combustion stroke. When the piston reaches TDC, a spark ignites the compressed air/fuel mixture.

During the combustion process, the temperature of the piston increases significantly. Methods used to cool the piston may include enriching the air/fuel mixture and/or adding piston squirters. Piston squirters spray oil at a skirt of the piston.

SUMMARY

An engine system comprises a temperature determination module, a temperature comparison module, and a fuel injection control module. The temperature determination module determines an engine temperature. The temperature comparison module compares the engine temperature and a temperature threshold.

The fuel injection control module adjusts a timing of fuel injection from a first range of an intake stroke to a second range of the intake stroke based on the comparison. The first range and the second range do not overlap. In further features, the second range includes top dead center (TDC) of the intake stroke.

In other features, the engine temperature includes a piston temperature. In further features, the piston temperature is estimated based on engine coolant temperature. In other features, the fuel injection control module adjusts the timing of fuel injection from the second range to the first range when the temperature decreases below a second temperature threshold. In further features, the second temperature threshold is equal to the temperature threshold.

A fuel injection timing control method comprises determining an engine temperature; comparing the engine temperature and a temperature threshold; and adjusting a timing of fuel injection from a first range of an intake stroke to a second range of the intake stroke based on the comparison. The first range and the second range do not overlap.

In further features, the second range includes top dead center (TDC) of said intake stroke. In other features, the engine temperature includes a piston temperature. In further features, the fuel injection timing control method further comprises estimating the piston temperature based on engine coolant temperature.

In other features, the fuel injection timing control method further comprises adjusting the timing of fuel injection from the second range to the first range when the temperature decreases below a second temperature threshold. In further features, the second temperature threshold is equal to the temperature threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
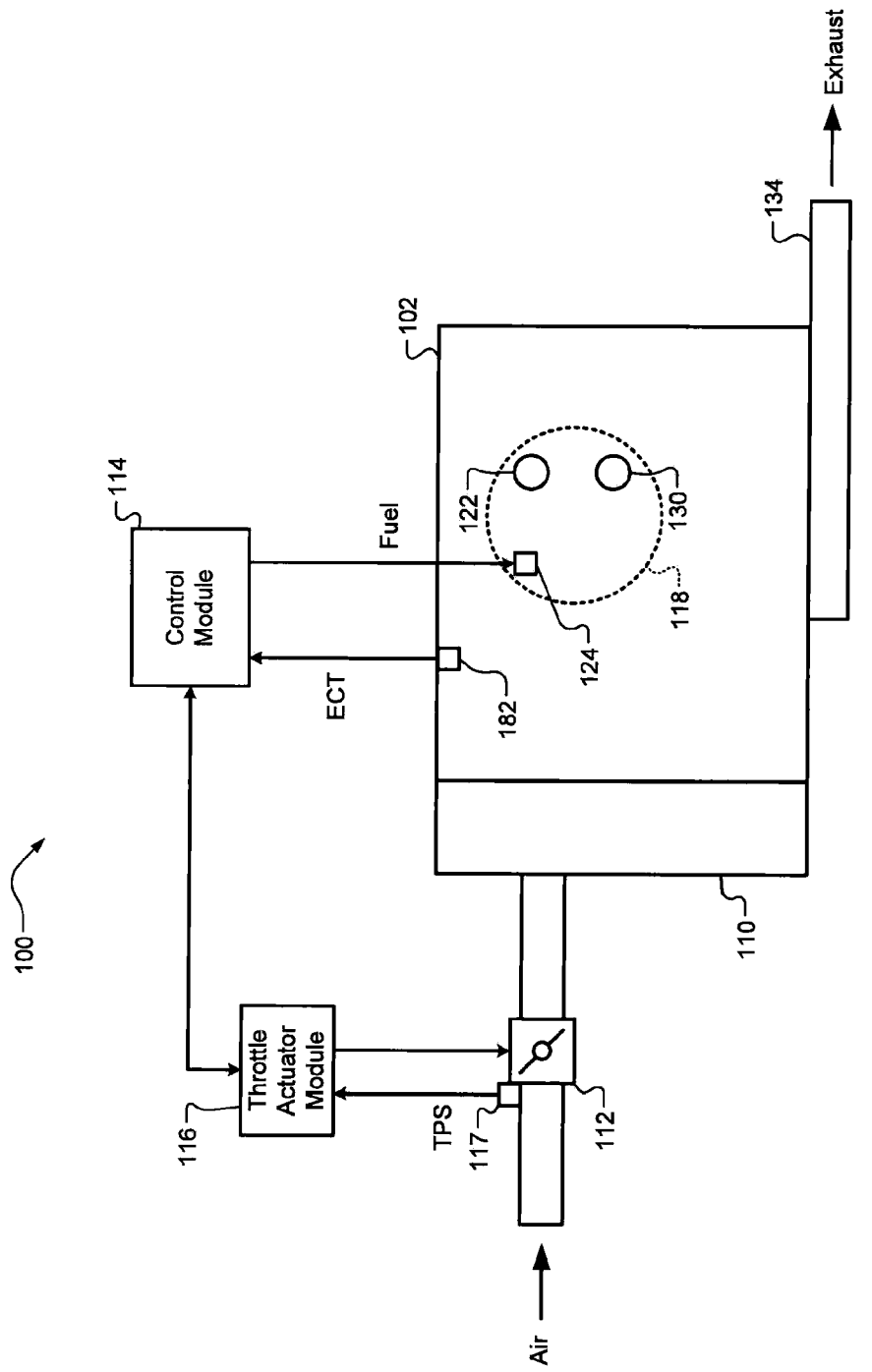
FIG. 1 is a functional block diagram of an engine system 100 according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In the present disclosure, when a temperature of a piston is above a threshold, timing of fuel injection is adjusted so that fuel is injected when the piston is closer to TDC. The fuel is injected directly onto the piston. By injecting the fuel directly onto the piston when the piston is closer to TDC, the fuel contacts the piston. As the fuel evaporates, the piston temperature decreases.

Figure 2:
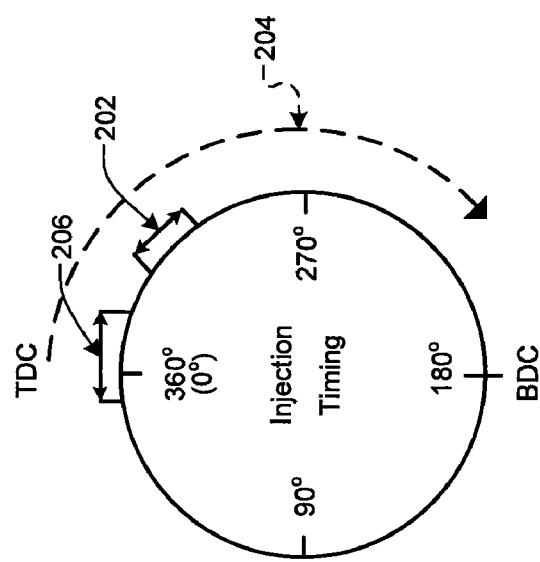
FIG. 2 is a graphical depiction of an exemplary fuel injection timing 200 according to the present disclosure.

Referring now to FIG. 2, a graphical depiction of exemplary fuel injection timing 200 is shown. Initially, fuel may be injected during a first period 202 of an intake stroke 204. Injecting fuel during the first period 202 may optimize fuel economy and emissions. For example only, the first period may include a period of time when the piston is between 280° and 315°. The fuel may be injected during the first period 202 of the intake stroke 204 until the piston temperature is greater than or equal to a first temperature threshold.

The piston temperature may be measured directly from the piston or indirectly, such as determined based on engine coolant temperature, intake air temperature, and/or RPM modeling, for example. The engine coolant temperature may be measured using the ECT sensor 182. The ECT sensor 182 may be located within the engine 102 or at other locations where the coolant is circulated.

When the measured temperature of the piston is greater than or equal to the first temperature threshold, the control module 114 may advance the injection timing to a second period 206 of the intake stroke 204. The second period 206 is a period of time when the piston is positioned closer to TDC of the intake stroke 204. For example only, the second period 206 may include a period of time when the piston is between 350° and 360°. In various implementations, the second period 206 may begin before the intake stroke 204.

Fuel may be injected during the second period 206 until the temperature of the piston reaches a second temperature threshold that is less than the first temperature threshold. In various implementations, the first and second temperature thresholds may be equal.

Figure 3:
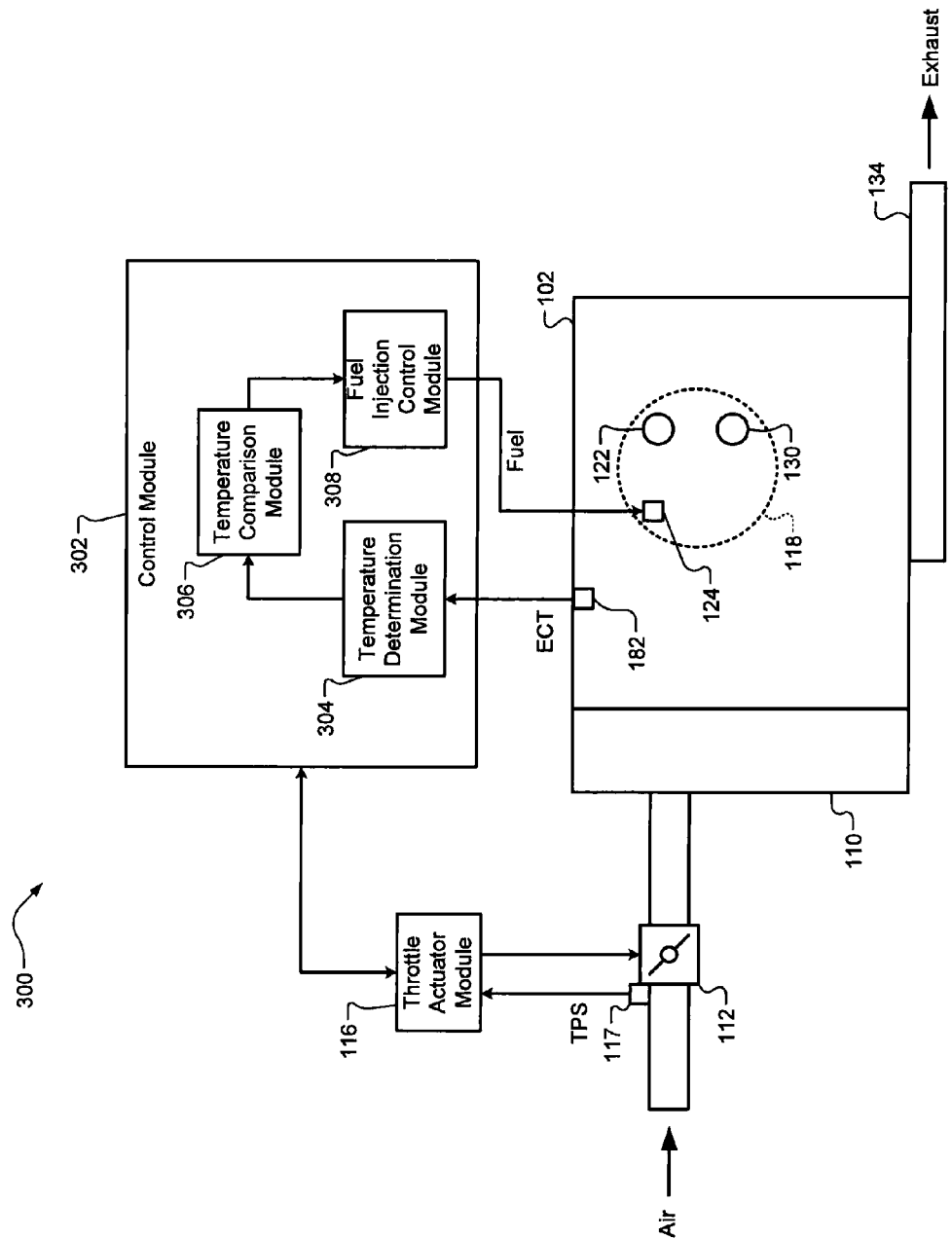
FIG. 3 is a functional block diagram of an exemplary implementation of an engine system 300 according to the principles of the present disclosure.

Referring now to FIG. 3, a functional block diagram of an exemplary implementation of an engine system 300 according to the principles of the present disclosure is shown. A control module 302 includes a temperature determination module (TDM) 304 that determines piston temperature. For example only, piston temperature may be determined by using a temperature sensor such as a thermocouple, an infrared and microwave telemetry system, an algorithm, a lookup table, and/or based on ECT. A temperature comparison module 306 receives the piston temperature and compares the piston temperature to the first temperature threshold.

The temperature comparison module 306 determines when to inject fuel based on the temperature comparison. When the measured temperature has reached the first temperature threshold, the fuel injection timing is adjusted to the second period 206. The temperature comparison module 306 may notify a fuel injection control module 308 when to inject fuel based on the determination. Fuel may be injected during the second period 206 until the measured temperature has decreased to the second temperature threshold.

When the temperature decreases below the second temperature threshold, the fuel injection timing is adjusted to the first period 202. The temperature comparison module 306 may notify the fuel injection control module 308 that fuel injection during the first period 202 is desired. The fuel injection control module 308 controls the fuel injection system 124 to spray fuel based on the notification.

Figure 4:
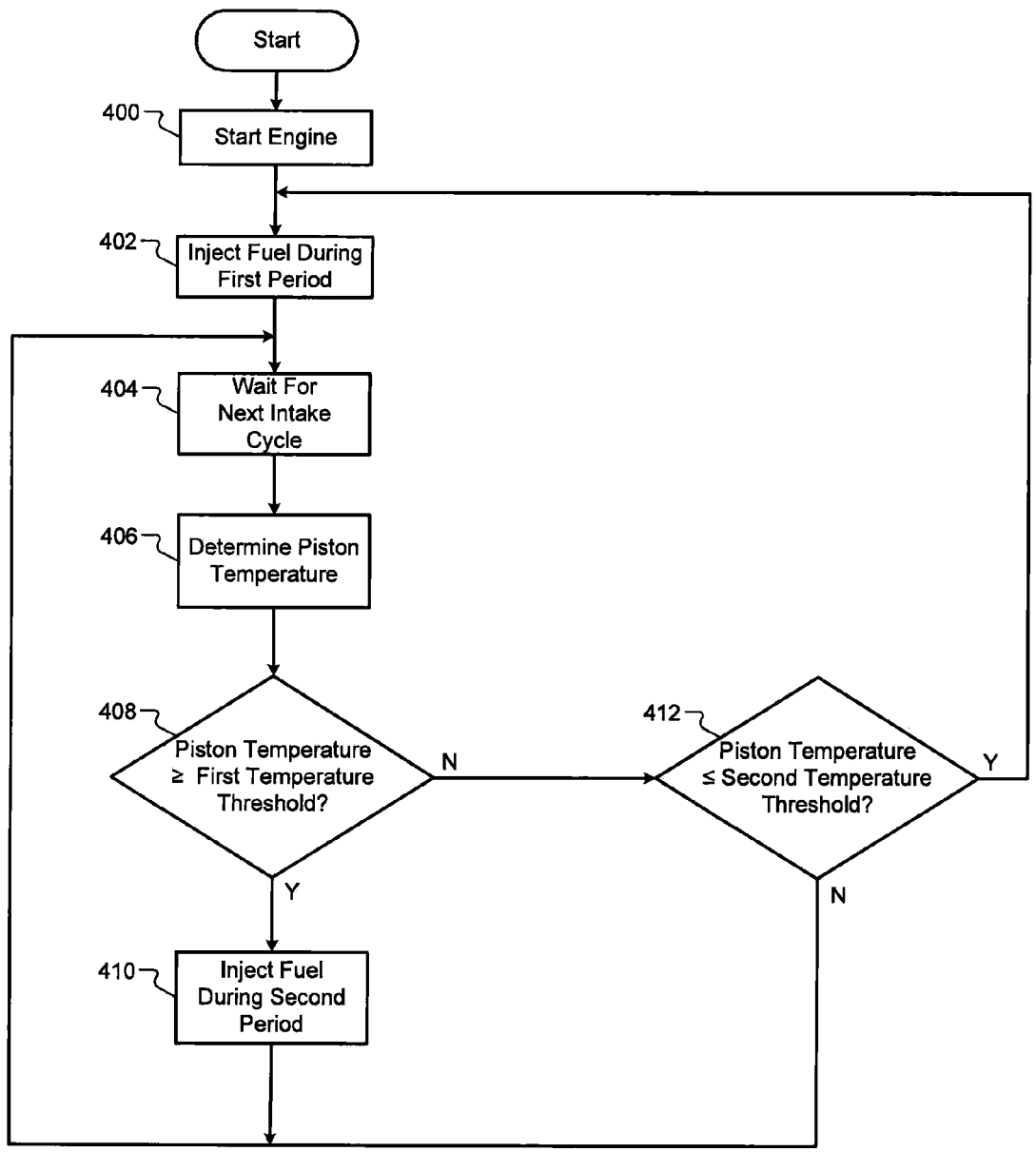
FIG. 4 is a flowchart that depicts exemplary steps of a fuel injection timing control method according to the principles of the present disclosure.

Referring now to FIG. 4, a flowchart that depicts exemplary steps of a fuel injection timing control method is shown. Control begins in step 400, where the engine is started. In step 402, control injects fuel during the first period of an intake stroke. In step 404, control waits for the next intake cycle to begin. In step 406, control determines the temperature of the piston.

In step 408, control compares the determined temperature to an first temperature threshold. The first temperature threshold is the trigger point for the adjustment of fuel injection from the first period to the second period. If the measured temperature is greater than or equal to the first temperature threshold, control transfers to step 410; otherwise, control transfers to step 412. In step 410, control injects fuel during the second period and returns to step 404.

In step 412, control compares the measured temperature to a second temperature threshold that is less than the first temperature threshold. If the measured temperature is less than or equal to the second temperature threshold, then control returns to step 402; otherwise, control returns to step 404.

Those skilled in the art can now appreciate from the foregoing description that the broad teachings of the disclosure can be implemented in a variety of forms. Therefore, while this disclosure includes particular examples, the true scope of the disclosure should not be so limited since other modifications may become apparent to the skilled practitioner upon a study of the drawings, the specification, and the following claims.

What is claimed is:

1. An engine system comprising:
   a temperature determination module that determines an engine temperature;
   a temperature comparison module that compares said engine temperature and a temperature threshold; and
   a fuel injection control module that adjusts a timing of fuel injection from a first range of an intake stroke to a second range of said intake stroke based on said comparison, wherein said first range and said second range do not overlap.

2. The engine system of claim 1 wherein said second range includes top dead center (TDC) of said intake stroke.

3. The engine system of claim 1 wherein said engine temperature includes a piston temperature.

4. The engine system of claim 3 wherein said piston temperature is estimated based on engine coolant temperature.

5. The engine system of claim 1 wherein said fuel injection control module adjusts said timing of fuel injection from said second range to said first range when said temperature decreases below a second temperature threshold.

6. The engine system of claim 5 wherein said second temperature threshold is equal to said temperature threshold.

7. A fuel injection timing control method comprising:
   determining an engine temperature;
   comparing said engine temperature and a temperature threshold; and
   adjusting a timing of fuel injection from a first range of an intake stroke to a second range of said intake stroke based on said comparison, wherein said first range and said second range do not overlap.

8. The fuel injection timing control method of claim 7 wherein said second range includes top dead center (TDC) of said intake stroke.

9. The fuel injection timing control method of claim 7 wherein said engine temperature includes a piston temperature.

10. The fuel injection timing control method of claim 9 further comprising estimating said piston temperature based on engine coolant temperature.

11. The fuel injection timing control method of claim 7 further comprising adjusting said timing of fuel injection from said second range to said first range when said temperature decreases below a second temperature threshold.

12. The fuel injection timing control method of claim 11 wherein said second temperature threshold is equal to said temperature threshold.

* * * * *